United States Patent
Reeder

[15] 3,656,783
[45] Apr. 18, 1972

[54] TRANSITION PIPE JOINT

[72] Inventor: Charles H. Reeder, Tulsa, Okla.
[73] Assignee: W & R Industries, Inc., Tulsa, Okla.
[22] Filed: July 23, 1970
[21] Appl. No.: 57,642

[52] U.S. Cl. .................................................... 285/239
[51] Int. Cl. .................................................... F16l 33/00
[58] Field of Search .................... 285/239, 242, 247, 250

[56] References Cited

UNITED STATES PATENTS

| | | | |
|---|---|---|---|
| 3,408,099 | 10/1968 | Appleton | 285/247 |
| 3,524,661 | 8/1970 | Farnam | 285/339 |

FOREIGN PATENTS OR APPLICATIONS

| | | | |
|---|---|---|---|
| 713,185 | 8/1931 | France | 285/242 |
| 1,453,994 | 8/1966 | France | 285/247 |
| 975,514 | 11/1964 | Great Britain | 285/247 |
| 352,206 | 3/1961 | Switzerland | 285/242 |
| 187,479 | 10/1922 | Great Britain | 285/242 |
| 810,335 | 8/1951 | Germany | 285/247 |

*Primary Examiner*—Andrew V. Kundrat
*Attorney*—Head & Johnson

[57] ABSTRACT

A transition connection for metal to plastic pipe wherein the plastic pipe, such as polyethylene, is cold-extruded to form a high tensile strength sealed connection.

12 Claims, 5 Drawing Figures

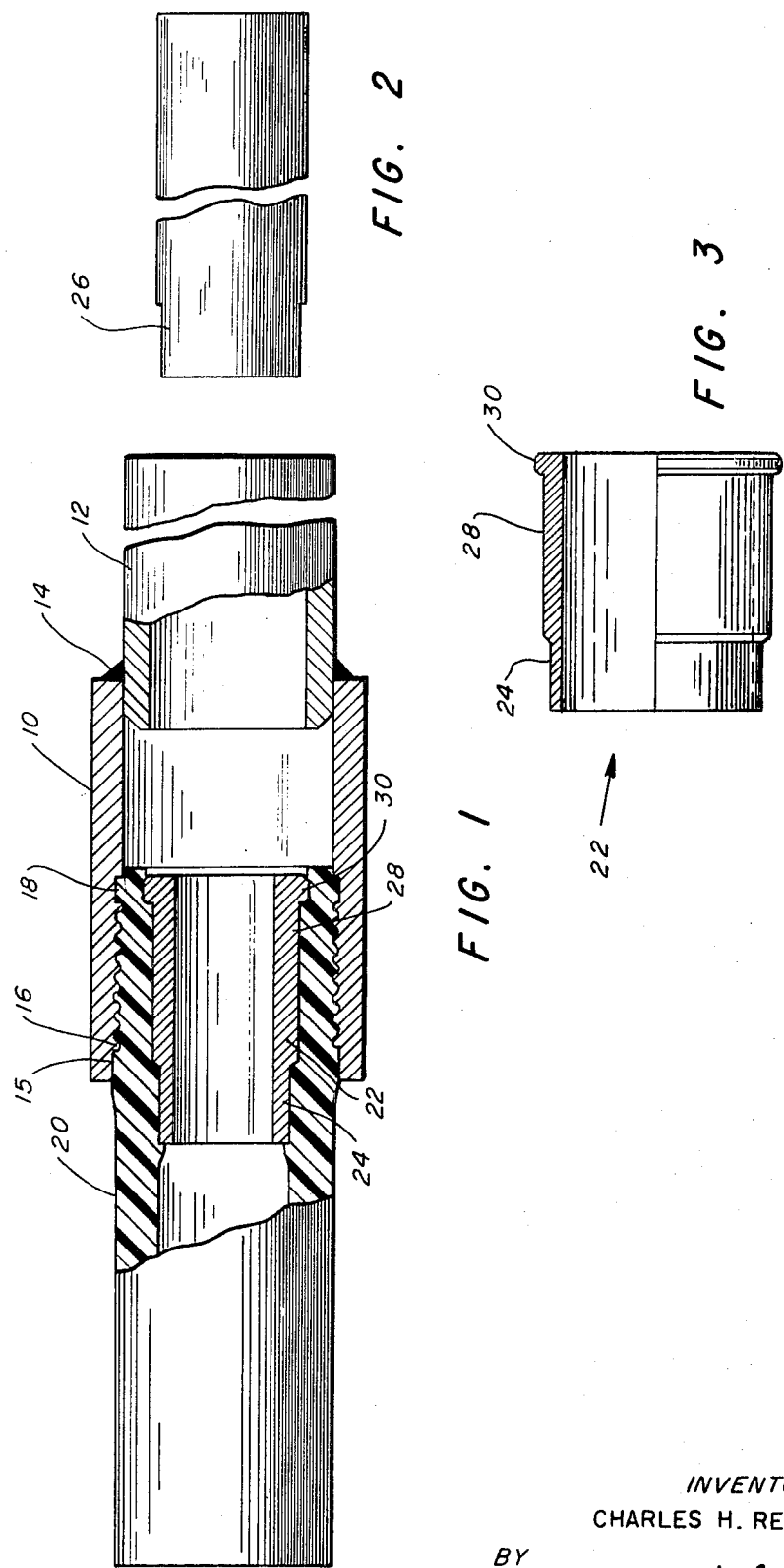

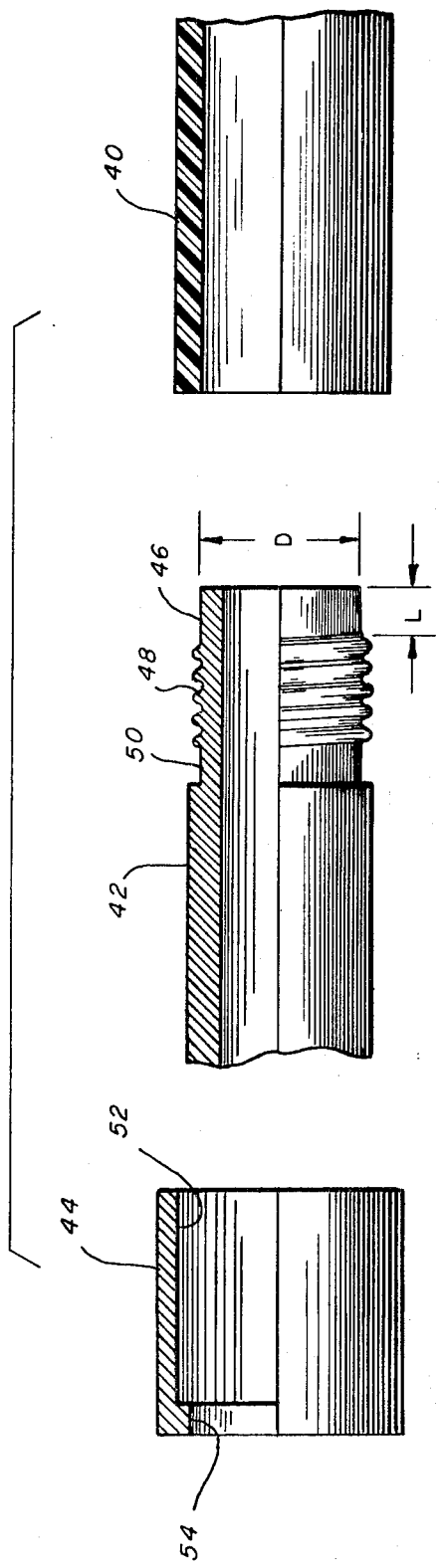
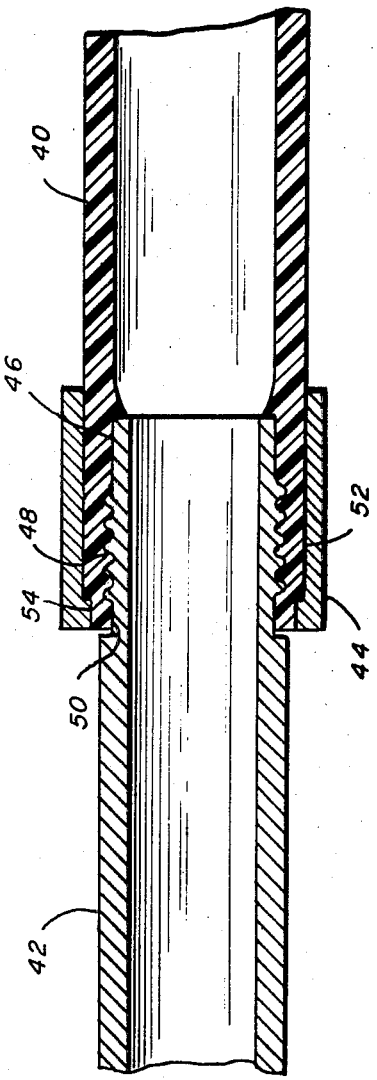

3,656,783

TRANSITION PIPE JOINT

BACKGROUND OF THE INVENTION

This invention relates to the art of interconnecting metal to non-metal pipe joints. More particularly, it relates to a coupling for metallic and plastic pipe, the latter of which is of a type capable of being cold-extruded.

High strength plastic pipes, such as polyethylene or polypropylene plastics, are becoming more commonplace as pipelines for fluids, especially in the domestic or home usage for gas and/or water lines. In many instances, however, it is necessary that a strong safe connection be made between the end of the plastic pipe and the more rigid and standard metallic pipe. The prior art heretofore has been primarily concerned with connecting more resilient members, such as rubber hose, with a metallic coupling and have not taught adequate and safe connections for metal to plastic pipe for use under conditions such as the home or domestic market.

RELATED APPLICATIONS

This application deals with a connection similar to that found in co-pending application 789,715 filed Jan. 8, 1969, now U.S. Pat. No. 3,524,661 which is incorporated herein for reference.

SUMMARY

This invention provides a connection for metal to plastic pipe, particularly wherein the plastic pipe is connected internally or externally to the metal pipe and incorporates features of and improvements over that disclosed in the aforesaid patent. More specifically, the invention provides a coupling wherein the metallic portion includes internal or external grooves or threads terminating in an interlocking groove and a specially designed sleeve or collar adapted to be forced internally or externally of the plastic pipe to cold-extrude the pipe into the interlocking grooves of the coupling. This provides a high strength, sealed, transition connection capable of use for gas lines and the like.

BRIEF DESCRIPTION OF THE DRAWINGS

FIG. 1 is a cross-sectional view showing the transition pipe joint connection of this invention.

FIG. 2 is a broken elevational view of a tool used in making the connection.

FIG. 3 is a partial sectional view of the interconnecting sleeve used in making the transition pipe joint of this invention.

FIG. 4 is an exploded view partly in cross section, showing a section of plastic tubing, the end joint of metallic pipe and the extrusion ring.

FIG. 5 is a sectional view of the members of FIG. 4 in their assembled position.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and is being practiced or carried out in various ways. Also it is to be understood that the phraseology or terminology employed herein is for the purpose of description and not of limitation.

Referring to the drawings and in particular to FIG. 1, the transition pipe joint of this invention comprises a metal coupling 10 formed either as or a part of metal pipe 12 as by weld connection 14. Internally from the open end of the metal pipe connector 10 is a first surface 15 followed by a plurality of second grooves or threads 16, preferably shallow round threads or round circular grooves, which extend from the pipe end to a terminal undercut or third groove portion 18.

The plastic tubing 20 is to be of a material capable of being cold-formed or extruded, and material such as polyethylene or polypropylene are inclusive of this invention.

In assembly, plastic pipe 20 is oriented internally of the coupling 10 to a position substantially covering the grooves 16 and 18 and slightly beyond. The compression sleeve 22 is thence oriented with portion 24 toward the end of plastic pipe 20. Thereafter an anvil member 26, such as shown in FIG. 3, is inserted within the metal tubing 12 and by the application of force to the anvil, the compression sleeve 22 is forced to the assembled position shown in FIG. 1. In doing so the plastic pipe is cold-extruded into the grooves 16 and 18. That is, circumferential portion 28 of the compression sleeve acts to extrude the plastic pipe into the groove 16. At the end of the compression sleeve 22 is an enlarged diameter portion 30 which is adapted to assist in cold-extruding the plastic pipe into the interlocking groove 18. It has been found that surface portion 24 relieves the extrusion material to substantially the cross-section as shown.

Referring now to FIGS. 4 and 5, an external connection is shown which comprises plastic pipe 40 which is to be connected to metallic pipe 42 utilizing extrusion sleeve 44. The metallic pipe 42 includes at its ends cylindrical surface 46 which is of dimension (D) to provide a slight interference fit with the internal diameter (ID) of plastic pipe 40. For example, such interference tolerances will range from 0.010 inch to about 0.40 inch for plastic pipe ranging in size from ¾ to 4 inches. The length (L) of the cylindrical section increases slightly with increasing diameter plastic pipe. That is, in the smaller pipe size range three-eighth inch is satisfactory while three-fourth inch is satisfactory in the larger sizes. As found in the aforesaid copending application, the metallic pipe includes a plurality of grooves or threads 48 of larger diameter than surface 46. The grooves or threads 48 terminate with a second circular groove 50. The extrusion sleeve 44 includes a first portion 52 and a second portion 54 which is of smaller diameter than the first portion. When the pipe is assembled, as shown in FIG. 5, plastic pipe 40 is first inserted about the end of the metallic pipe to extend over a portion or all of groove 50. Thereafter sleeve 44 is forced thereover to the position shown extruding the pipe not only into the groove 50 but also between the grooves or threads 48 with the cylindrical portion 46 providing further relief for the extruded pipe. Such connection and because of cylindrical portion 46 the plastic pipe is prevented from cold flowing from between the sleeve 44 and metallic pipe 42. In destructive tests it is found that the plastic pipe will pull apart or fail before the fitting and joint, hereinabove described, fails both with the internal and external design.

In the usage of this invention, it has been found that the coupling is particularly useful as a transition pipe fitting relative to meter risers as used with fluid supply lines such as fuel gas lines, water lines, and the like. That is, the connector of this invention is particularly applicable for connecting a metal pipe riser to and from a meter for connection with the main gas line and/or the user's line, if of plastic pipe of the type described herein.

What is claimed:

1. A metal pipe to plastic pipe transition connection comprising:

a straight end metal pipe including, form said end, a first internal peripheral surface, a second series of internal grooves extending from said first surface to a third internal circumferential groove;

a plastic pipe of cold-extrudable material, a portion of which extends internally within said metal pipe so as to be coaxial and opposite said first surface, said second grooves and said third groove; and a rigid substantially cylindrical compression sleeve, forced to be coaxial internally about said portion of said plastic pipe, said sleeve, beginning at one end, having sequentially a first external peripheral surface of substantially uniform diameter, a second external peripheral surface of substantially uniform diameter slightly greater than said first surface so as to be of greater interference fit to said plastic pipe than said first surface and oriented so as to extrude said plastic pipe into said second grooves, a third external peripheral surface of substantially uniform diameter slightly greater than said second surface so as to provide interference fit of said plastic pipe and extrude same into said third groove.

2. A transition connection of claim 1 wherein the length of said sleeve is longer than the total length of said first surface, second grooves and third groove so as to extend, when assembled, beyond the end of said metal pipe.

3. A connection of claim 1 wherein said second internal grooves are threads.

4. A connection of claim 3 wherein said threads are round.

5. A connection of claim 1 wherein said third groove is about 0.010 to 0.020 inch below the maximum diameter of said second grooves.

6. A connection of claim 1 wherein said plastic pipe is polyethylene.

7. A metal pipe to plastic pipe transition connection comprising:
a straight end plastic pipe being of an extrudable material;
a straight end metal pipe including, at said end about which said plastic pipe is received:
a first cylindrical portion adjacent said end,
a second series of external grooves extending from said first portion to a third circumferential groove,
said first cylindrical portion and second grooves being of dimension to cause interference fit with the I.D. of said plastic pipe when fitted thereover;
a rigid cylindrical sleeve extending circumferentially about said plastic pipe, said sleeve having a first internal peripheral surface of substantially uniform diameter interference fitted with the O.D. of said plastic pipe so as to extrude said plastic pipe into said second grooves, and said sleeve having a second internal surface of substantially uniform diameter yet of greater interference fit with said O.D. than said first surface to extrude said plastic pipe into said third groove, the length of said first cylindrical portion being proportioned relative to the size of said plastic pipe being used such that it is of sufficient length to prevent cold flow of said plastic pipe from between said rigid cylindrical sleeve and said metal pipe.

8. A connection of claim 7 wherein the length of said cylindrical sleeve is longer than the total length of said first surface, said second grooves and said third groove so as to extend, when assembled, beyond the end of said metal pipe.

9. A connection of claim 7 wherein said second external grooves are threads.

10. A connection of claim 9 wherein said threads are round.

11. A connection of claim 7 wherein said third groove is about 0.010 to 0.020 inch below the minimum diameter of said second grooves.

12. A connection of claim 7 wherein said plastic pipe is polyethylene.

* * * * *